United States Patent [19]

Hangen et al.

[11] Patent Number: 4,792,948
[45] Date of Patent: Dec. 20, 1988

[54] DISTRIBUTED SWITCHING ARCHITECTURE

[75] Inventors: Joaquin J. Hangen, Olney; Robert A. Swithers, Gaithersburg; William A. Whelpley, Randolph; Fred S. Lee, Rockville, all of Md.

[73] Assignee: Data General Corporation, Westboro, Mass.

[21] Appl. No.: 763,701

[22] Filed: Aug. 8, 1985

[51] Int. Cl.$^4$ .............................................. H04J 3/16
[52] U.S. Cl. ...................................... 370/95; 370/66
[58] Field of Search ................. 370/95, 58, 85, 104, 370/66

[56] References Cited

U.S. PATENT DOCUMENTS

| | | | |
|---|---|---|---|
| 3,924,077 | 12/1975 | Blakeslee | 370/95 |
| 4,504,946 | 3/1985 | Raychaudhuri | 370/95 |
| 4,530,093 | 7/1985 | Akram et al. | 370/58 |
| 4,621,357 | 11/1986 | Naiman et al. | 370/58 |
| 4,672,604 | 6/1987 | Bhatia et al. | 370/58 |

*Primary Examiner*—Douglas W. Olms
*Attorney, Agent, or Firm*—Robert J. Koch

[57] ABSTRACT

A communication network made up of distributed switching stations controlled by a network control center. The distributed switches communicate with each other over long haul links and locally with users over short haul communication channels to user switches. Each user switch interfaces a distributed switch to a plurality of individual users. Communication is carried out in a Demand Assigned Multiple Access fashion with the distributed switches communicating with differential inbound and outbound data frame lengths. The outbound frames being shorter and in time division multiplexed (TDM) format. The inbound data frames from the user switches are longer and in time division multiple access (TDMA) format.

23 Claims, 5 Drawing Sheets

DISTRIBUTED SWITCHING ARCHITECTURE

FIELD OF THE INVENTION

This invention relates to a Demand Assigned Multiple Access communication network and more particularly to a distributed switching architecture for implementing the communication network.

SUMMARY OF THE INVENTION

The communication network according to the present invention is characterized by a distributed switching architecture. The network is intended to cover a large geographic area for transmission of digital signals including voice and data signals. The distributed architecture is made up of short haul communication networks, a long haul communication network, and a control network overlay. The short haul communication networks are each focused on a specific area or sector for communicating directly with individual users. The long haul network is for communicating over greater distances generally point to point satellite links or ground communication links effect this communication. The control network overlay has a centrally located installation for controlling communications, however, data transmissions are not routed through the installation, only control and protocol signals.

A distributed switch node or S/Node serves as an interface between the short haul network and the long haul network and as a distribution point for communication in a specific region. A short haul network is made up of a plurality of user or customer nodes, each designated as a C/Node for communications with individual user devices. The C/Nodes interface to user termination equipment or devices. Such equipment may include, but is not limited to, word processing devices, computers, personal or otherwise, facsimile devices, Video-Teleconferencing equipment, PABX and telephone equipment including PCM and CVSD (Continuously Variable Slope Data) devices.

The C/Nodes include user ports which may contain digitizing equipment for telephonic voice communication and a data compression device. The data compression function is provided for so that a user may transmit at a user selected variable rate. The data is received at a rate indicative of the speed set by a particular user termination device, it is then stored in a buffer until a transmission time socket is available and transmitted at a higher rate. Similarly, when data is received it is at a much higher rate of speed than is appropriate for the termination device and is expanded by the buffer and made available to the termination device at a compatible speed.

A Time Socket distribution function is also provided within the C/Node. Data transmission to and from the C/Node are in the form of Data Frames. Each frame is composed of a plurality of time sockets. Each socket contains data for an individual user. The system allows for Demand Assigned Multiple Access (DAMA) to the network. According to the invention, each data frame comprises a plurality of time sockets, each associated with an individual user, assigned according to demand. The C/Node receives data from its associated individual users in a sequence defined by the sockets and composes data frames for transmission to the S/Node. In addition, the C/Nodes receive data frames from an associated S/Node access the frames to accept data intended for it and distribute that data depending on the assigned sockets to the proper individual user termination device. The composition of data frames and distribution of sockets is accomplished with the aid of a time plan propagated through the network control overlay.

Another feature of the invention is an idle pattern suppression device incorporated into the socket distribution function. To simplify the use of the socket function the idle pattern common to voice and data ports is an "all high" pattern. When transmitted as data, this pattern of "all ones" signifies an "abort" signal to the termination equipment. In a Pulse Code Modulation (PCM) ports, the idle generator is implemented by incorporating inversion logic in the PCM encoding circuit so that the idle pattern appears as "all low" to the PCM circuit. In the case of a CVSD voice port, a toggling circuit is included to produce a high/low bit stream from the "all high" pattern. The high/low bit stream represents an idle pattern to the CVSD circuitry.

The distributed switch node or S/Node transmits to and receives from a plurality of C/Nodes, routes the user communications wholly within its region, and acts as the interface to the long haul network. An S/Node generally communicates in one or more sectors. Each sector, for example, may be a quadrant of the associated region. There are a plurality of C/Nodes communicating with the S/Node in each sector in a time division fashion. The communication between the S/Nodes and C/Nodes may be carried out by radio or ground communication links.

According to a feature of the invention, each sector of the S/Node transmits a continuous Time Division Multiplexed (TDM) signal to all C/Nodes in a sector. The S/Node receives Time Division Multiple Access (TDMA) bursts from all of the C/Nodes in a sector. The origination and destination end of a communication circuit include Customer Premises Equipment (CPE) which includes the C/Node. As stated above, the socket assignment function is carried out in the CPE. A socket is the connection of a timeslot on a high speed synchronous bus to a user port. The data on the bus is put out over a channel connecting the CPE to an S/Node.

The technique employed differs from the method used in traditional TDM or TDMA techniques because the channel is left in place when a user call is taken down or completed. Only the "socket" is reset, allowing the channel to be assigned to a new port when a new call is initiated. The time sockets are reassigned or shuffled based on demand for communication space on the network when transmission are completed or new communications need to be initiated.

In traditional TDM techniques, the port is always connected to a channel. In a traditional TDMA transmission, the channel is taken down when transmission from a port is terminated. According to a feature of the invention the TDM and TDMA channels are always left in place although all the time sockets are not always assigned to a user port. Data transmission float to an "idle pattern" (all high) when a socket is not assigned to a particular port.

Another feature of the invention is a differential inbound and outbound frame length with respect to a point to multi-point communication node. The S/Node of the invention has this characteristic. In a multi-user star network where a number of installations, in this case C/Nodes share a bandwidth and communicate via a central location, transmission efficiency and delay are improved by selecting a different in-bound (towards the S/Node) frame length than the out-bound (towards the C/Node) frame length. Each frame transmitted comprises a data portion and a preamble for burst detection, source station identification, overhead messages, etc. Frame efficiency is measured by the ratio of data to total bits transmitted. Since the preamble is a fixed length independent of the frame length it is clear that an increase in frame length increases in the data per frame resulting in a desirable increase in frame efficiency. TDM/TDMA transmissions are made possible by compressing user data from multiple users and transmitting the data over a single channel at high data rates. In this type of system the longer the frame length, i.e., the more data compressed from a single user into one frame, the longer the delay. As a result of the out-bound TDM transmissions, a single data frame is transmitted to all of the receiving stations. Only a single preamble is required so that short frame length can be used without substantial delay or loss of efficiency. It is thus advantageous to attach only a single preamble to a relatively short frame, for example 1.5 ms, greatly increasing efficiency without substantially effecting delay. The inbound TDMA transmissions originate from a plurality of sources. Each source must transmit its own preamble along with the data. In order to keep the frame efficiency from degrading, a relatively long frame length, for example 15 ms, is used for inbound transmissions.

A long haul network serves to carry on communication between different regions of the telecommunications network. The long haul network is made up of multiple distributed switching nodes or S/Nodes. Each S/Node has a plurality of interfaces including an interface for each sector in its region and one or more long haul interfaces for communicating with other S/Nodes. The long haul interfaces may be implemented via point-to-point links which are treated in the same manner as sector interfaces or a conventional T1 trunk facility with DSX-1 compatible interface. Transmission can be carried out over satellite or ground communication links.

The S/Nodes conceptually have a plurality of data transmission highways, each assigned to a different interface. A Time Slot Interchange (TSI) is resident in each S/Node to provide switching between the various transmission highways connecting a central transmission point, in this case the S/Node, to various customer premises equipment (CPEs). The TSI is responsible for traffic management between the various interface modules. The TSI will input data from all active interfaces, perform space and time switching of data blocks according to a Burst Time Plan (BTP) and output data to all active interfaces.

The TSI does not need to input all data received from an active interface. For example, the TSI will never be required to send out any preambles; therefore, it need not input any.

The major task of the TSI is to perform space and time switching of all incoming data. This implies that a data burst or block in one time slot of the frame from an active device to the TSI can be sent from the TSI to any active device in any time slot within the frame. If the source active device inputs to the TSI in a TDMA format, the TSI must also convert this data in a format compatible to the TDM transmission before the space and time switching takes place. Moreover, if the broadcast mode is invoked, this data can be sent to multiple active elements in a time which is unique for each destination active device.

The time slot in which a data block arrives at the TSI is not usually the same as the time slot in which it leaves. In particular, the time slot in which the data block leaves can be earlier in the frame than when it arrives. Since it is impossible to send out data before it arrives, all data will be transmitted in the next frame time period after it was received. If a nibble being received at the very beginning of a frame is transmitted at the end of the next frame, due to time slot switching, then the data may incur up to a two frame delay.

The control network overlay is made up of a Network Control Center (NCC) centrally located and in communication with the distributed switch nodes. The Network Control Center operates to control the network in response to varying service demands; changes in circuit demand will necessitate reallocation of internal network resources. This includes changing user subscription-time parameters by generating the burst time plans.

Further aspects of the invention will become clear in the description of the preferred embodiments described in reference to the attached drawings.

BRIEF DESCRIPTION OF THE DRAWINGS

The invention shall be described below with reference to the drawings. In the drawings.

DETAILED DESCRIPTION OF THE PREFERRED EMBODIMENT

Figure 1:
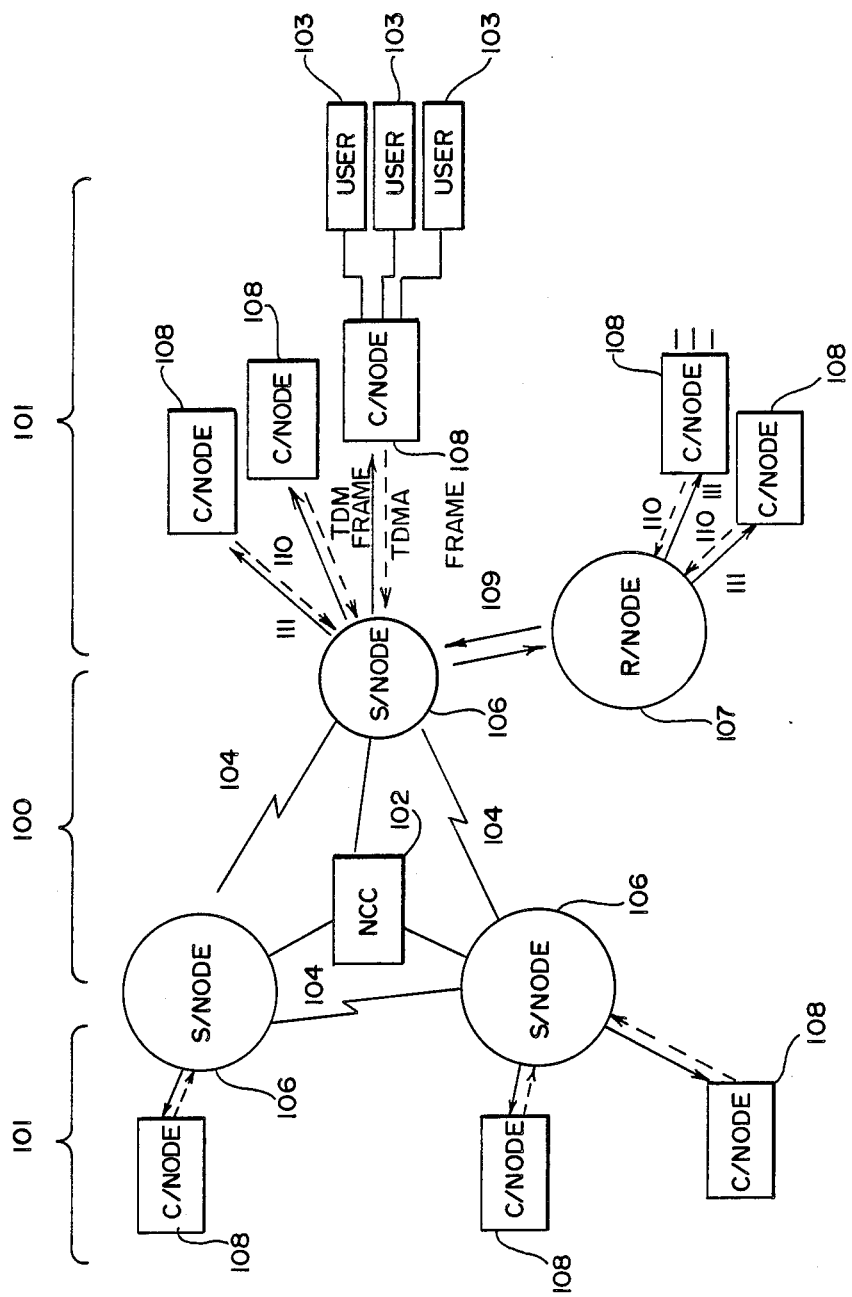
FIG. 1 shows the overall network architecture.

FIG. 1 shows overall the network made up of a long haul network 100 and a number of short haul sub-networks 101. The long haul network interconnects the short haul sub-networks by communication links 104 which may be, for example, satellite links or direct ground communication links. FIG. 1 shows that the short haul subnetworks are made up of a combination of distributed switched nodes or S/Node 106, repeater nodes or R/Nodes 107 and user nodes or C/Nodes 108. All of these DTS (digital termination service) type point-to-multipoint equipment are interconnected together as a switched local service. FIG. 1 shows the Network Control Center 102 (NCC) for network monitoring/control connected to the S/Nodes and user termination devices 103 connected to the C/Nodes 108.

The short haul subnetworks 101 extend the long haul network over a local metropolitan area. FIG. 1 shows the short haul subnetworks which are made up of customer nodes 108 (C/Node), repeater nodes 107 (R/Node), and switching nodes 106 (S/Node), with interfacility links 109 (IFL) between the repeater or R/Nodes and the S/Nodes.

The short haul network operates in TDM (time division multiplex) mode from the R/Nodes and the S/Nodes as well as in the IFLs, indicated by the solid lines 111. The C/Node transmission is in TDMA (time division multiple acess) mode indicated by the broken lines 110.

The S/Node and R/Node beam area coverage is in sectors of 90°, to permit a greater bandwidth utilization. As S/Node may be deployed with one, two, three, or four sectors of coverage, depending on customer requirements. The orientation of the sectors should be such that maximum isolation of band and beam nulls is achieved.

The interface between the long haul network and the local subnetworks uses primarily the DSX-1 crossconnect standard, T1 format, which permits a variety of IFL media. The interface hardware at both ends of the IFL 104/109 treats the T1 link as a "split-T1", that is, a group of 24 channels, each of 64 kbps which are activated on a selective basis. The data connection between the local networks may be T1 links. Overhead control information is distributed to the local subnetwork multiplexed within one of the 64 kbps channel imbedded in the standard T1 links.

The highest level system partitioning is shown in FIG. 1 to be a long haul network of communication links and local subnetworks at each metropolitan area connected to the earth stations via inter-facility links (IFLs). The long haul network may be made up of general service earth stations (GSES)(not shown).

The local subnetworks that tie into long haul links comprise digital termination systems (DTS). Two configurations of DTS sites are shown in FIG. 1. C/Nodes at the customer sites communicating with S/Nodes that perforom data switching and act as gateways to the long haul network, and R/Nodes or "repeater" nodes that extend the S/Node capabilities beyond its radius of access.

The digital termination system must be developed in a variety of configurations, forcing the development of the DTS equipment into a building block type of design. The simplest configuration is the non-redundant node shown in FIG. 2. This is typical of the C/Node equipment.

Figure 2:
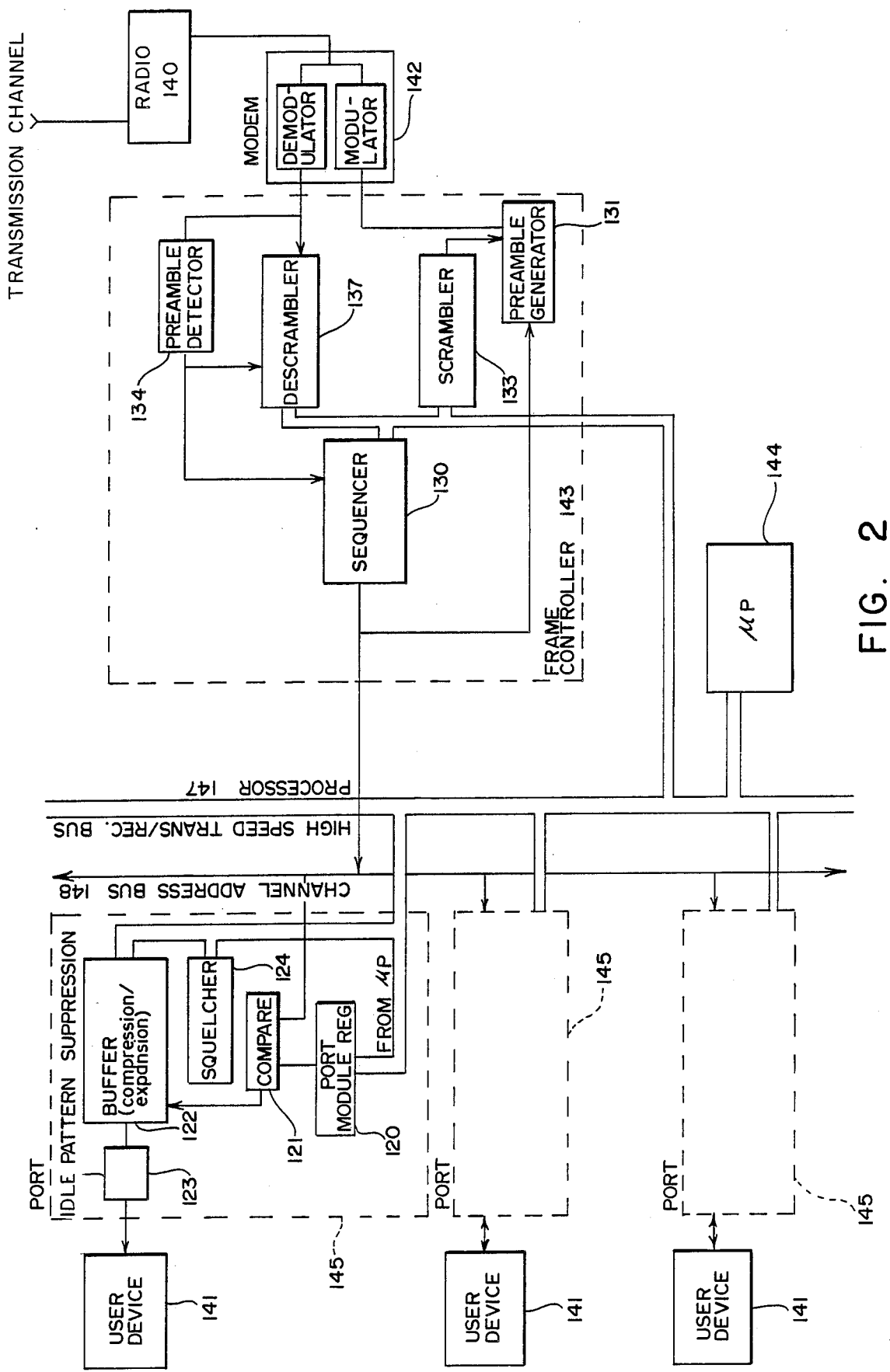
FIG. 2 shows a user node (C/Node) as shown in FIG. 1.

FIG. 2 shows a typical modular node such as a customer or user node. The DTS RADIO 140 is connected over IF cable to a Cellular Communications Processor (CCP). The CCP comprises a modem 142, a frame controller 143, a microprocessor controller ( P) 144 and a number of interface ports 145 connected to user termination devices 141. A parallel bus 147 is used by the processor to control the node, assign port speeds, and burst time plans which in turn determine the source and destination of data and fetch the overhead information. A high speed serial bus within the processor bus 147 is used by each frame controller to transfer data to the interface ports.

The S/Nodes and R/Nodes must provide coverage over one or more sectors, thus requiring multiple DTS RADIS. Each RADIO requires a modem and a frame controller, but these all are imaged by a single nP controller. A CCP at an S/Node or R/Node location will consist of an expanded version of the unit shown in FIG. 2, with various modem-frame controller module pairs, each connected to a RADIO.

An R/Node or S/Node will typically serve many customers per sector. The individual components of the system such as the R/Nodes, S/Nodes and C/Nodes will be described in greater detail below.

The S/Node

The network is made up of a long haul network of earth stations or ground links and local subnetworks connected to the long haul link via inter-facility links (IFLs). The S/Node transmits to and receives from user terminals (C/Nodes), routes to users within the local region, and acts as the region's gateway to the long haul network. The S/Node equipment together with that region's R/Nodes and C/Nodes make up a local subnetwork.

Figure 3:
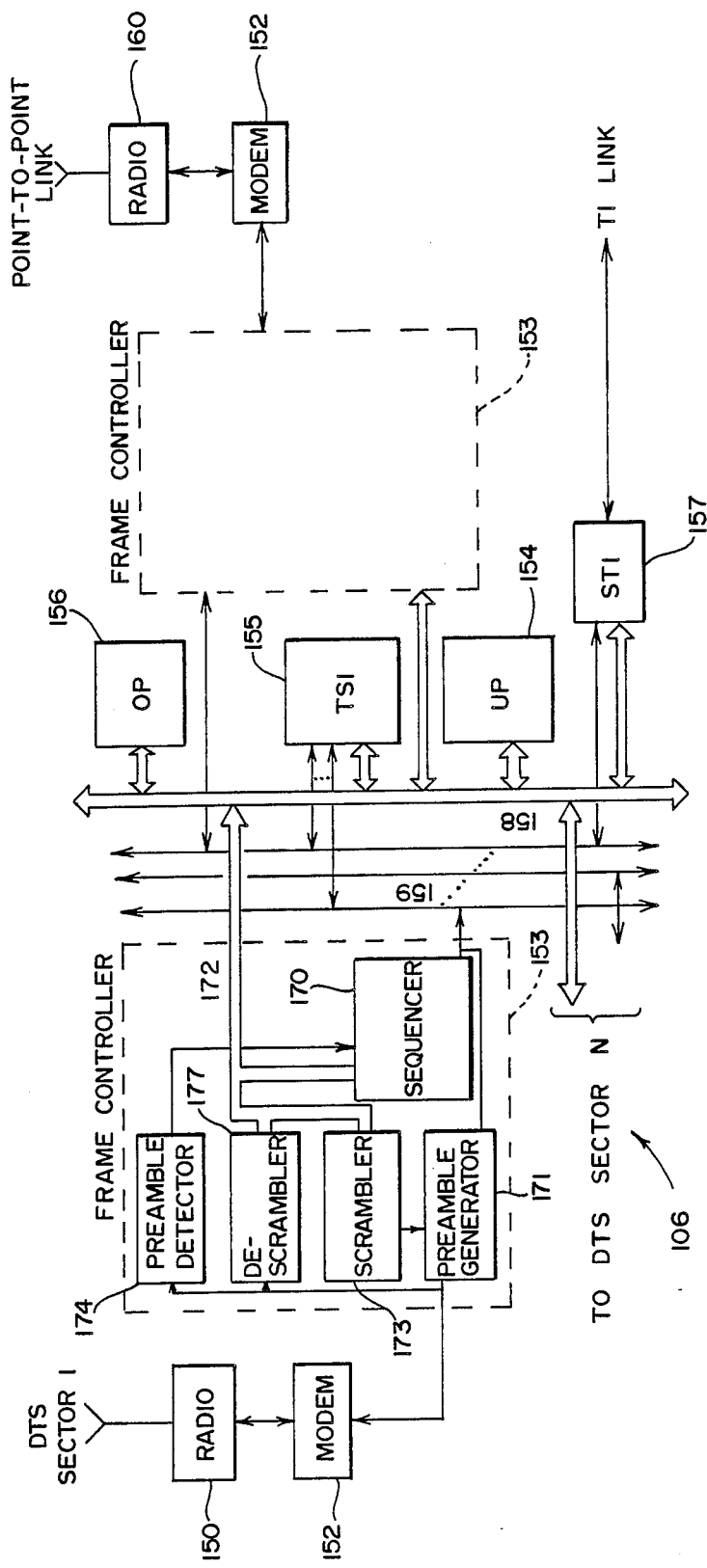
FIG. 3 shows a distributed switch node (S/Node) as shown in FIG. 1.

FIG. 3 shows S/Node 106 in detail. The DTS RADIO equipment 150 connected over IF cable to the CCP. The CCP is made up of a number of modems 152 and frame controllers 153 depending on the number of sectors covered, a microprocessor controller (nP) 154, a time slot interchange module 155 (TSI), an overhead processor function may be performed by the P module or by a separate processor 156 and one or more interface ports to service the interfacility link 157. A parallel bus 158 is used by the nP to control the node, load the frame controllers with routing information transfer data and fetch the overhead information. The TSI module 155 is used to temporarily hold data waiting for the appropriate time slot for re-transmission. A high speed serial bus within the bus 158 is used by each frame controller to transfer data to the TSI or to the interface ports, and separate address busses are provided for addressing the TSI by each frame controller.

Each sector of an S/Node transmits a continuous (TDM) modulated signal to all C/Node terminals in that sector, and to adjacent S/Nodes or R/Nodes. The S/Node receives TDMA bursts from all local C/Nodes. The TDM transmission and TDMA reception may have, for example, the following characteristics:

TDM frame rate of 1.5 ms;
TDM multiframe of 15 ms (10 TDM frames);
TDMA frame of 15 ms, in-phase with the TDM multiframe;
High speed transmission bit rate of 1.792 Mbps;
DCQPSK modulation;
Data on assigned time slots;
Assignments sent on TDM overhead channel; and
Requests received on TDMA overhead channels.

The S/Node uses two kinds of DTS RADIO equipment:

DTS RADIO I 150 for point-to-multipoint links; and
DTS RADIO II 160 for point-to-point links.

The RADIO I 150 may be a high output power radio with 90° antenna coverage for broadcasting over a DTS sector. One such radio is used per sector for communications between the S/Node and the C/Nodes in that sector.

The RADIO II 160 may be a low output power radio with a narrow beam coverage using a traditional parabolic reflector. It is used for point-to-point communications between two S/Nodes, between an S/Node and its nearby R/Node, or as the S/Node gateway to the long haul network.

The cellular communications process (CCP) is responsible for S/Node framing and control, distribution of the assignment information, local switching, interfacing with the long haul inter-facility link (IFL) 157, assignment of the request channels via a token channel, and modulation/demodulation.

The functions performed by the CCP are:

IFL interface compression/expansion for burst transmission;
Traffic switching via time slot interchange;
Assignment of request channels;
Circuit set-up handshake with the NCC;

TDM framing and multiplexing;
TDMA burst detection and demultiplexing
Modulation and demodulation;
Redundancy switching;
Status and alarm reporting to NCC; and
Power supply.

The block diagram of the S/Node version of the CCP is shown in FIG. 3. The overhead processor (OP) 156 is responsible for fetching the overhead messages to memory and vice-versa. This request/assignment handshake is carried out over the token control channel (not shown). The nP controller 154 participates in the call set-up procedure with the network control center (NCC) (i.e., distribution of assignments), status monitoring and redundancy switchover commands, and status reporting. The frame controller 153 carries out the transmission processing functions, i.e., TDM framing and TDMA detection. The time slot interchange 155 (TSI) provides storage for time slot switching. Finally, the ports 157 interface to the IFL, while the modem interfaces to the radio.

The interconnection between the CCP (frame controller 153) and the radio is two IF coaxial cables. One coaxial cable carries the modulator IF output to the radio upconverter, and the second cable carries the received IF from the downconverter to the demodulator.

The interface between the S/Node and the long haul network may be handled by two methods. The first method is via point-to-point DTS links, as shown in the right half of FIG. 3. In that case, the CCP simply treats the point-to-point frame controller in the same manner as a sector controller. Data destined to the long haul network is switched to the point-to-point controller and modem via the TSI module.

The second method uses a conventional T1 facility (1.544 MHz) with DSX-1 compatible interface. However, the interface to the CCP is instead a "split-T1" port (ST1) that can identify and ignore the unassigned 64 kbps channels when converting to or from burst mode. This approach is shown in FIG. 3, 157. Consequently, the dialogue between the NCC and the S/Node nP is carried out over the overhead channel of the point-to-point DTS channel or imbedded in the first 64 kbps channel of the T1 link. An independent link for the overhead transmission is not required.

The modem 152 may employ differentially coherent quadrature phase shift keying (DCQPSK), with a suitable choice of transmit and receive filtering.

The frame controller 153 is responsible for TDM frame generation and formatting, including preamble generation, TDMA burst detection, scrambling and descrambling of the user data, and executing the burst time plan at burst rate.

The block diagram of the frame controller module is shown in FIG. 3. The heart of this module is a dual sequencer 170 that executes the burst time plan. The sequencer is a frame counter addressing a memory that the processor has loaded with the frame events, such as Unique Word (UW) aperture, frame start, start of overhead, etc. This logic is duplicated to permit the P 154 to load a new plan on the off-line memory stack while the on-line sequencer is executing at normal speed.

In the transmit side, the sequencer 170 starts the preamble generator logic 171 at the start of the frame. Subsequently, it reads its port 172 used as an overhead buffer, the ST1 port and the TSI module, enables the scrambler logic 173 and appends the data traffic to the overhead.

In the receive side, preamble or Unique Word (UW) detection is performed by the preamble detector. The UW detection pulse is used to start the descrambler 177 and realign the sequencer 170, which in turn enables the port used as overhead buffer, the IFL port and/or the TSI memory.

Time Slot Interchange

The Time Slot Interchange (TSI) 155 interfaces multiple active modules within an S/Node. FIG. 3 shows the relationship of the TSI 155 with other module of the S/Node CCP. Active modules, such as frame controllers 153 and active ST1 157 interfaces, control the internal transmit and receive address bus 158, by address control bus 159. These active elements direct the data transfers of passive elements, such as voice ports and data ports.

The TSI is responsible for traffic management between active modules. Data transfers involving passive modules will always bypass the TSI. The TSI performs the following functions:

Input data from all active elements;
Perform space and time switching of the data blocks per a burst-time-plan (BTP);
Output data to all active elements; and
Interface to a microprocessor for setup, status, and alarms.

The TSI must be able to accept data for example from up to eight active devices simultaneously. The data can enter the TSI from a given active element in either the TDM or TDMA format. The maximum rate of data transfer is 14.336 MHz (1.792 MHz/device $\times$ 8 devices). The maximum nibble rate on the high speed bus is therefore 3.584M nibbles per second or approximately 279 ns per nibble.

The TSI does not need to input all data received from an active device. For example, the TSI will never be required to send out any preambles; therefore, it need not input any preambles. The TSI will monitor the receive bandwidth bus 159. All data from the receive data bus will be accepted by the TSI except when the two most significant bits on the bus are set to ones, indicating a preamble.

The manner that the time and space switching occurs is specified in a burst-time-plan (BTP). One BTP is provided for each active element to determine where and in what order data is to be obtained from the TSI 155 for a given active device. The BTPs are loaded by the microprocessor 154. The microprocessor 154 must be able to configure a new BTP for any of the active elements without affecting any of the current BTPs. This is accomplished with a dual BTP memory scheme. In FIG. 3 dual sequencer 170 has one memory bank which is "on line" performing the TSI transmit sequence while the other memory bank is "off line" available to the microprocessor via the interface.

Figure 4:
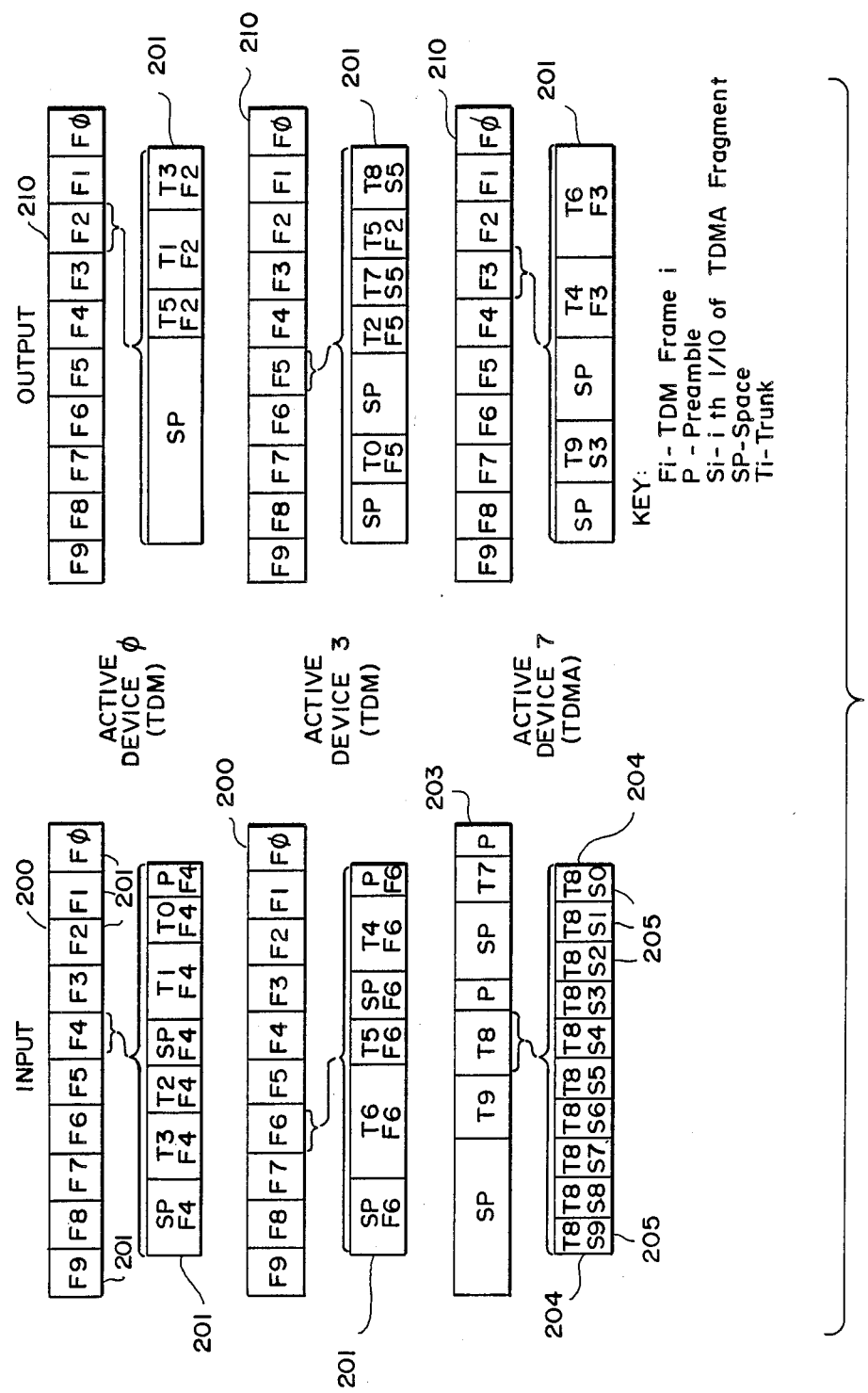
FIG. 4 shows an example of the time slot interchange time and space switching.

FIG. 4 demonstrates the time and space switching which occurs in the TSI. This particular example contains no passive devices in the S/Node, therefore all data is routed via the TSI. Both input TDM channels 200 and output channels 210 are divided into data frames 201. TDMA input channels are composed of individual TDMA transmissions 204 each with a plurality of fragments 205. The TDM data frames 201 and the TDMA data transmission 204 are made up of data time sockets with differing sources and destinations within the user nodes.

Once the data has been entered and reformatted per the BTPs, it must be output to the active devices. Not all data to be transmitted by any active device comes from the TSI, only those which have come from other active devices. The TSI must be able to recognize when it is the desired source. This is accomplished by monitoring the transmit address bus. Of the 64 addresses (six bits) assigned to this bus, two addresses are reserved; one is for the null address 111111 and the other for the TSI (000000). When the TSI code of 000000 (Odec) is output on the transmit address bus, the TSI knows it is involved in the data exchange, and will output the correct nibble onto the data bus.

The output of the TSI is always in the TDM format. As in the input the data rate transfer is a maximum of 3.584M nibbles per second, or approximately 279 ns per nibble.

The TSI can be broken up into two logical entities; the receive cycle and the transmit cycle. The receive cycle is responsible for inputting the data from the receive data bus into the TSI. This data must be stored in a format compatible with the transmit burst time plan (BTP). The transmit cycle is responsible for outputting the data in the proper space and time slot.

The circuits of the Receive Cycle loads the storage memory in a format compatible with the transmit burst time plan (BTP). There are separate TDM and TDMA storage memories. Data storage is arranged such that there is a memory storage section devoted to each active element transferring data into the TSI. There may be up to eight active elements; therefore, the TDM and TDMA memories are broken up into 8 sections each. A configuration register within the control circuit 234 shown in FIG. 5 in the TSI holds the information provided by the microprocessor which determines whether an active element is TDM or TDMA.

Data received from a TDM element is stored contiguously in that active elements corresponding section of memory. Data received from a TDMA element is reformatted into ten TDM frames, each containing a scaled down version of the TDMA multi-frame. The data is then stored in an address based upon frame number, nibble, and receive bandwidth.

Figure 5:
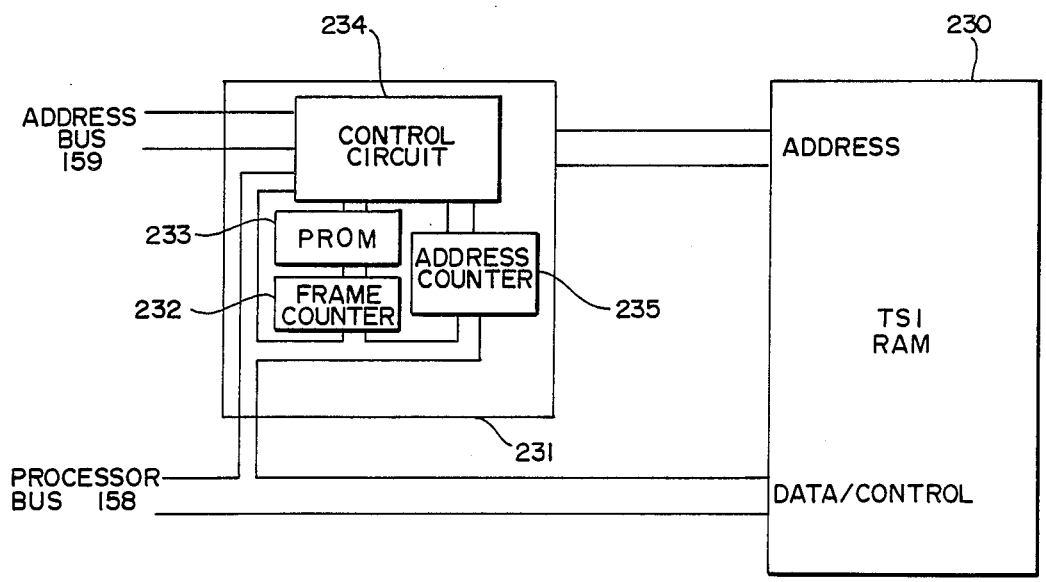
FIG. 5 shows a block diagram of the time slot interchange.

The TDM Receive Cycle is straightforward. Data entering the TSI from the receive data bus is in 1.5 ms TDM format. This information is entered directly into the TDM RAM. A logical block diagram of the TDM Receive Cycle is shown in FIG. 5.

In the receive cycle the address bus 159 provides the address generator 231 with bus enable signals indicative of the active device receiving data. Control and configuration information as well as the received data are provided over the processor bus 158. The TSI RAM 230 is divided into a plurality of sectors, each corresponding to a different active device. The address generator 231 enables the sector of the RAM corresponding to the active device receiving a data frame. The address generator also includes an address counter 235 for generating sequential address for the individual words or nibbles received within the data frame.

The address generator is reset when a TDM frame is receiver over the processor bus 158.

The TDMA Receive cycle is somewhat more complex than the TDM Receive Cycle. In an exemplary embodiment, the information entering the TSI in a 15 ms TDMA frame must be converted to ten 1.5 ms TDM frames. These ten TDM frames must be formed such that each tenth of the TDMA trunk is placed in the same relative location in each of the ten memory sections corresponding to a TDM frame.

The generation of TDM multiframe addresses divided into 10 TDM fame address sets can be easily accomplished by providing within the address generator a frame counter 232 whose output is incremented upon receipt of a complete TDM frame within a TDM multiframe. The output of the frame counter can then be converted by a PROM 233 to provide a frame offset to the address input of the RAM 230. The control circuit 234 operates to provide the TSI RAM 230 with the proper address signals based upon the inputs from the processor bus 158 and the address bus 159.

The transmit cycle operates to send out data from the TSI to the proper active device in the proper sequence. This is accomplished by assigning a burst time plane (BTP) to each active device. Each BTP specifies where each active device is to obtain its data from the TSI for a full TDM frame. The TSI is enabled during the transmit cycle by the processor. Each frame controller 153 is respectively enabled by the processor. The sequencer within the enabled frame controller then provides addresses contained in the burst time plan to the time slot interchange.

The sequences are constantly providing address information to the memory even if no data is to be output from the TSI. The BTPs are specified for the entire TDM frame, including preambles, spaces, and data involving passive modules. The sequencer presents the location in the TSI memory of the data word to be transmitted. Since all sequencers operate independently, the broadcast mode is easily implemented. Each of the eight sequencers can read from the desired location in memory at any time during their frame.

R/Node

Figure 6A:
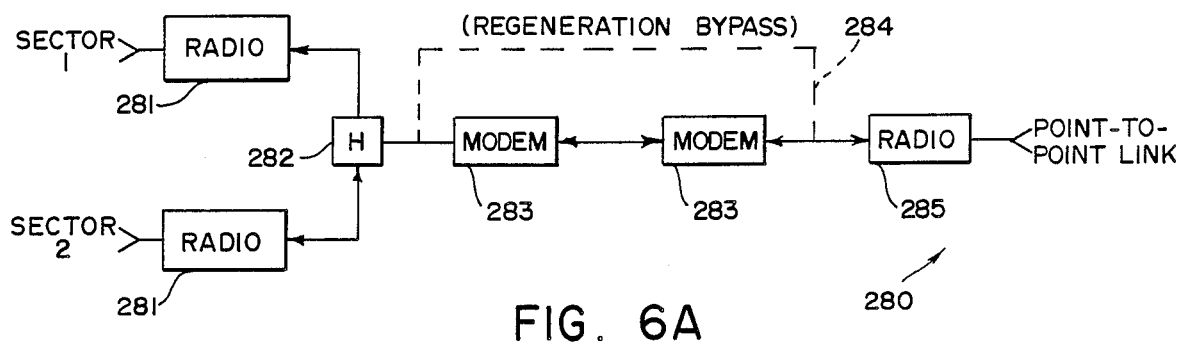
FIG. 6A shows a Repeater Node covering two sectors with an single channel.
Figure 6B:
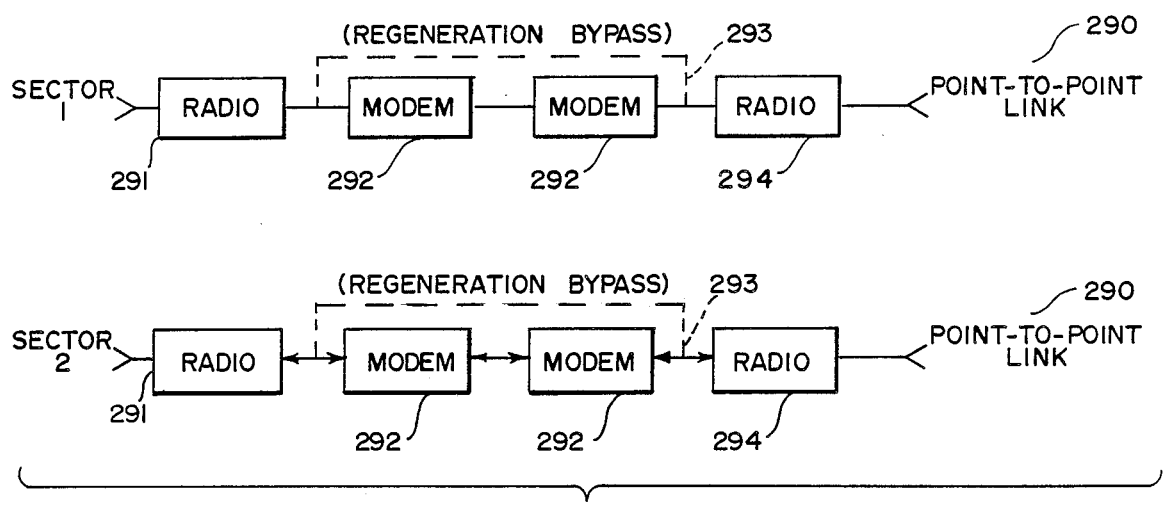
FIG. 6B shows a Repeater Node covering two sectors with a dual channel.

The simplest R/Node configurations are shown in FIGS. 6A and 6B. A typical R/Node may serve one or two sectors. A fully loaded sector will typically use one DTS RADIO/modem per sector.

Each sector of an R/Node transmits a continuous (TDM) modulated signal to all C/Node terminals in that sector, and to the adjacent S/Node. The R/Node receives TDMA bursts from all C/Nodes in the sector.

The R/Node uses two kinds of DTS RADIO equipment:

DTS RADIO I 281 for point-to-multipoint links; and
DTS RADIO II 285 for point-to-point links.

The RADIO I 281 is a higher output power radio with 90° antenna coverage for broadcasting over a DTS sector. One such radio is used per sector for communications between the R/Node and the C/Nodes in that sector.

The RADIO II 285 is a lower output power radio with a narrow beam coverage using a traditional parabolic reflector. It is used for point-to-point communications between the R/Node and its nearby S/Node.

The R/Node is a repeater in the true sense of the word. The continuous TDM channel received from the S/Node is sent in broadcast mode to the C/Nodes within the sector of coverage. The TDMA bursts are likewise received by the R/Node radio/modem and sent in continuous form as if a TDM channel had been received to the S/Node.

In an application where the distances are limited and thus signal-to-noise ratios are high, the modem regeneration can be bypassed. The sector RF equipment would then connect directly to the point-to-point radio.

The S/Node thus treats the data to and from the R/Node as if an additial sector was supported. It transmits a TDM channel to those extra users, and receives the bursts back from the users.

In supporting two sectors with an R/Node, if the sectors are lightly loaded, a single modem can broadcast over both sectors. FIG. 6A shows such an R/Node 280. The point-to-multipoint radios I are shown by 281 and are connected to a spliter 282. Modem 283 is provided but can be bypassed by regeneration bypass 284. A point-to-point RADIO II 185 is provided for communication with an S/Node. The assignment of the C/Node bursts is such that an overlap is avoided, since the burst plan assumes that all those C/Nodes are in the same sector. If enough traffic exists at the R/Node, two TDM links 290 to and from the S/Node must be set up, in effect creating two R/Nodes at that particular location, as shown in FIG. 6B. Each TDM link is made up of a point-to-multipoint Radio 291, a set of modems 292, a regeneration bypass 293, and a point-to-point Radio 294.

C/Node

FIG. 2 shows the configuration of a customer or user mode (C/Node). This is typical of the C/Node equipment serving a single user. FIG. 2 shows a RADIO 140 connected to a Cellular Communications Processor (CCP). The CCP consists of the modem 142, the frame controller 143, the microprocessor controller (nP) 144 and a number of interface ports 145. A parallel bus 147 is used by the processor 144 to control the node, assign port speeds and burst time plans, which in turn determines source and destination of data, and fetch the overhead information. A high speed serial bus contained within the processor bus 147 to transfer data to the interface ports 145. A channel address bus 148 is used by the frame controller to enable the individual ports 145.

The C/Node receives a continuous (TDM) modulated signal, from its associated distributed switch node, from which it obtains clock timing (receive and transmit) signals, carrier extraction signals, framing (receive and transmit), overhead control information, and received data. The C/Node transmits a TDMA burst to the nearest R/Node or S/Node in an assigned time slot with the same clock rate and framing as the received signal.

The RADIO 140 is a low power narrow beam radio that uses a traditional parabolic reflector antenna. This radio is for communications between the user's C/Node and the nearby S/Node and R/Node serving a particular subscriber.

The cellular communications processor (CCP) is responsible for the C/Node control, processing of the received time slot assignments, and modulation/demodulation.

The functions performed by the CCP are:
User interface;
Compression/expansion for burst transmission;
Channel assignment interchange with user and NCC (signalling protocols, call supervision and clearing, etc.);
Deframing and demultiplexing of received TDM signal;
Formatting of TDMA burst transmission;
Status and alarm reporting to NCC;
Modulation and demodulation; and
Power supply.

The block diagram of the C/Node version of the CCP (CCP/C) is shown in FIG. 2. The nP controller 144 is responsible for assignments, control and monitoring. The frame controller 143 carries out the transmission processing functions. The ports 145 interface with the user while the modem 142 interfaces to the radio 140.

A number of user interfaces may be used with this system, such as a voice interface and a variable rate data interface. The voice interface is a standard telephone line. The multi-rate interface may be dual connector port with selection for RS-232 or RS-449 standards.

The frame controller is responsible for TDM frame detection, including unique word (UW) or preamble detection, preamble generation, scrambling and descrambling of the user data, and executing the burst time plan at burst rate.

The heart of the frame controller 143 is a dual sequencer 130 that executes the burst time plan. The sequencer is a frame counter addressing a memory that the nP has loaded with the frame events, such as UW aperture, carrier on, start of preamble, etc. This logic may be duplicated to permit the nP to load a new plan on the off-line memory stack while the on-line sequencer is executing at normal speed.

During transmission, the sequencer 130 starts the preamble generator logic 131 at the time indicated in the burst time plan stored within the sequencer memory. Subsequently, it reads the port 132 used as overhead buffer and starts the scrambler logic 133 to generate a scrambled data frame suitable for transmission.

During the C/Node receive cycle a data frame is received from the demodulator. The preamble detector monitors the incoming signal and detects a Unique Word (UW) which signifies a preamble at the start of a data frame. The preamble detector issues a UW detection pulse to start the descrambler 177 which serves to descramble the incoming data frame. The preamble detector is also connected to the sequencer in order to realign it for the receipt of a new data frame, which in turn enables the port used for overhead data as well as the appropriate user ports.

The processor 144 provides the sequencer 130 with a Burst Time Plan (BTP) over the processor bus 147. The burst time plan is a sequence of "plan port addresses" stored in a sequencer memory. The processor assigns each active port an "assigned port address" which is stored in a port module register 120. The assigned port address corresponds to the plan port address during a time socket when the user port is to be enabled to transmit or receive data.

A compare circuit 121 within the user ports compares the plan port address from the sequencer 130 provided by the channel address bus 148 to the assigned port address in the port module register 120 and enables the compression expansion buffer 122 upon a match. The buffer serves a temporary storage for the data which is transmitted at a much higher rate than generated or accepted by the user devices 141.

The compression of data for transmission allows multiplexing a great number of user transmissions over the same transmission channels. The buffers may be set for various baud rates depending on the particular user device. When the buffer is enabled during reception, the data blocks are demodulated in the modem 142, descrambled at 137 and transferred over the bus 147 to the buffer. During transmission, the buffer when enabled puts data onto the processor bus 147 which is scrambled at 133 and modulated by the modem 142.

An idle pattern suppression circuit 123 may be provided in the user port as an interface between the user port and its associated user device. The idle pattern suppression circuit may contain simply a bidirectional inverter for PCM user devices or a toggling circuit for CVSD devices. The port may also be provided with a squelching circuit 124 in the interface between the buffer 122 and the bus 147 for detecting failed signals and squelching the outputs.

While the invention has been particularly shown with reference to a preferred embodiment thereof, it will be understood by those skilled in the art that various changes may be made therein without departing from the spirit and scope of the invention.

What is claimed is:

1. A distributed switching architecture for a communication network comprising:
   a plurality of groups of user ports for message transmissions;
   a plurality of user node means for receiving message transmissions from user ports, composing data frames from said message transmissions, transmitting the data frames in TDMA bursts over an associated communication channel, receiving continuous TDM signals including data intended for individual user ports, and distributing the data to the individual user ports, said user node means being connected to all of the user ports in a group;
   a plurality of distributed switch means, each connected to at least one user node means by respective associated communication channels and at least one other distributed switch means by communication links, for receiving data frames in TDMA bursts from its associated user node means and receiving data frames from associated distributed switch means, temporarily storing the data frames in a storage device located within said distributed switch means, and transmitting TDM data frames to associated user node means in accordance with a time plan and transmitting data frames to associated distributed switch means; and
   a means for network control connected to all distributed switch means for generation and distribution of said time plan.

2. A distributed switching architecture as in claim 1 wherein each of said user node means is located proximately to a group of user ports and each of said distributed switch means is located centrally to one or more socket assignment means.

3. A distributed switching architecture as in claim 1 wherein the data frames transmitted by the user node are inbound frames and the data frames transmitted to the user node are outbound data frames,
   said inbound data frames and outbound data frames are of different lengths wherein said outbound data frames are shorter than said inbound data frames.

4. A distributed switching architecture as in claim 3 wherein said user node means comprises:
   frame controller means connected to said communication channel for time socket assignment of said data frames; and
   processor means connected to said frame controller and all of said user ports in a group by a high speed transmit/receive processor bus for controlling said user ports and said frame controller; and
   a channel address bus means connected to said frame controller and said user ports for enabling said ports.

5. A distributed switching architecture as in claim 4 wherein said frame controller means comprises:
   sequencer means connected to said processor bus for storing a burst time plan received from said processor means and assigning time sockets by sequentially outputting plan port addresses contained in said burst time plan to said channel address bus;
   means for scrambling outbound data frames connected to said processor bus;
   means for generating preambles and adding said preambles to scrambled inbound frames responsive to said sequencer means and connected to said communication channel;
   means connected to said communication channel for detecting preambles of said outbound data frames and providing a preamble detect signal to said sequencer means;
   means connected to said processor bus responsive to said communication channel and said preamble detect signal for descrambling said outbound data frames.

6. A distributed switching architecture as in claim 5 wherein each user port comprises:
   buffer means coupling said processor bus with a user termination device for data compression and expansion;
   register means connected to said processor means by said processor bus for storing an assigned port address;
   means responsive to said register means and said channel address bus for comparing said assigned port address to said plan port address and connected to enable said buffer means based on a match.

7. A distributed switching architecture as in claim 6 wherein said user port further comprises means for squelching a failed signal connected to said processor bus means.

8. A distributed switching architecture as in claim 6 wherein said user port further comprises means for idle pattern suppression connected to said buffer means.

9. A distributed switching architecture as in claim 6 wherein said user termination device comprises data processing terminals.

10. A distributed switching architecture as in claim 6 wherein said user termination device comprises telephones.

11. A distributed switching architecture as in claim 6 wherein said user terminating device comprises means for receiving said message transmissions.

12. A distributed switching architecture as in claim 6 wherein said user termination device comprises means for transmitting said message transmission.

13. A distributed switching architecture as in claim 6 wherein said user termination device comprises means for transmitting and receiving said message transmissions.

14. A distributed switching architecture as in claim 3 wherein said distributed switch means comprises:
   a plurality of frame controller means each assigned to a different communication channel for time socket assignment of outbound data frames and interfacing with said communication channel;
   a processor means connected to all of the frame controllers by high speed transmit/receiver processor bus for controlling said frame controllers;

a time slot interchange means for temporary storage of message transmissions connected to said processor bus; and a time shared address bus means for addressing said time slot interchange means, each address bus connected to an individual frame controller means and said time slot interchange means.

15. A distributed switching architecture as in claim 14 wherein said distributed switch means further comprises:

a means for interfacing with a long haul truck connected to said processor bus and an additional address bus means which is connected to said time slot interchange means.

16. A distributed switching architecture as in claim 14 wherein said frame controller comprises:

sequencer means connected to said processor bus for storing a burst time plan received from said processor means and assigning time sockets by sequentially outputting plan channel addresses contained in said burst time plan time slot interchange by said address bus means;

means for scrambling outbound data frames connected to said processor bus;

means for generating preambles and adding said preambles to scrambled outbound frames responsive to said sequencer means and connected to said communication channel;

means connected to said communication channel for detecting preambles of said inbound data frames and providing a preamble detect signal to said sequencer means;

means connected to said processor bus responsive to said communication channel and said preamble detect signal for descrambling said inbound data frames.

17. A distributed switching architecture as in claim 16 wherein said time slot interchange means further comprises:

means for receiving inbound data frames from all said plurality of frame controller means and storing said data frames in a predetermined location; and means for outputting said data frames to said plurality of frame controllers in accordance with the burst time plan provided to the time slot interchange in the form of plan channel addresses over said address bus means.

18. A distributed switching architecture as in claim 17 wherein said distributed switch means further comprises means for time division multiplexed interfacing with a long haul trunk connected to said processor bus and an additional address bus means which is connected to said time slot interchange means; and wherein said means for receiving further comprises means for receiving and storing time division multiplexes data frames from said means for interfacing with a long haul trunk; and means for receiving reformatting and storing time division multiple access data frames from said frame controller means.

19. A distributed switching architecture as in claim 3 further comprising means for extending transmission range by repeating message transmissions between user nodes and a distributed switch.

20. A point-to-multipoint communication system comprising:

a plurality of remote communication terminals;

a central switching terminal for communicating with said remote terminals over a plurality of communication channels including;

a plurality of means for interfacing said central switching terminal with said communication channels, receiving inbound data frames from said remote terminals implementing a stored burst time plan for outputting outbound data frames to said remote terminals in a demand assigned fashion;

processor means for controlling said means for interfacing and generating and providing said burst time plan to said means for interfacing;

time slot interchange means for temporary storage of said data frames wherein inbound frames are stored in a predetermined order based upon the channel they are received from and outbound data are output in a sequence prescribed by said burst time plan;

processor bus means for connecting said processor means to said means for interfacing and time slot interchange means to said means for interfacing;

a time shared address bus means, connecting the time slot interchange means to a means for interfacing for providing said time slot interchange means with plan addresses contained in said burst time plans.

21. A point-to-multipoint communication system as in claim 20 wherein said inbound data frames and said outbound data frames are of different lengths, said outbound data frames being shorter than said inbound data frames.

22. A method of point-to-multipoint communication between a plurality of remote terminals and a central station which receives inbound data frames and transmits outbound data frames made up of a plurality of time sockets with differing sources and destinations within said remote terminals comprising the steps;

for inbound communication:

each remote terminal successively transmitting time division multiple access inbound data frames to the central station;

the central station receives the inbound data frames and loads them into a time slot interchange for temporary storage;

for outbound communication:

resequencing the stored time sockets into outbound data frames in accordance to a burst time plan;

transmitting the burst time plan to the remote terminals;

transmitting the outbound data frames in time division multiplexed fashion to all associated remote terminals;

each remote terminal accessing the outbound data frames in accordance to the burst time plan and receiving only the data of those time sockets with a destination within said remote terminal.

23. A method of point-to-multipoint communications as in claim 22 wherein said inbound data frames and outbound data frames are of different lengths, said outbound data frames being shorter than said inbound data frames.

* * * * *